Figure 1:
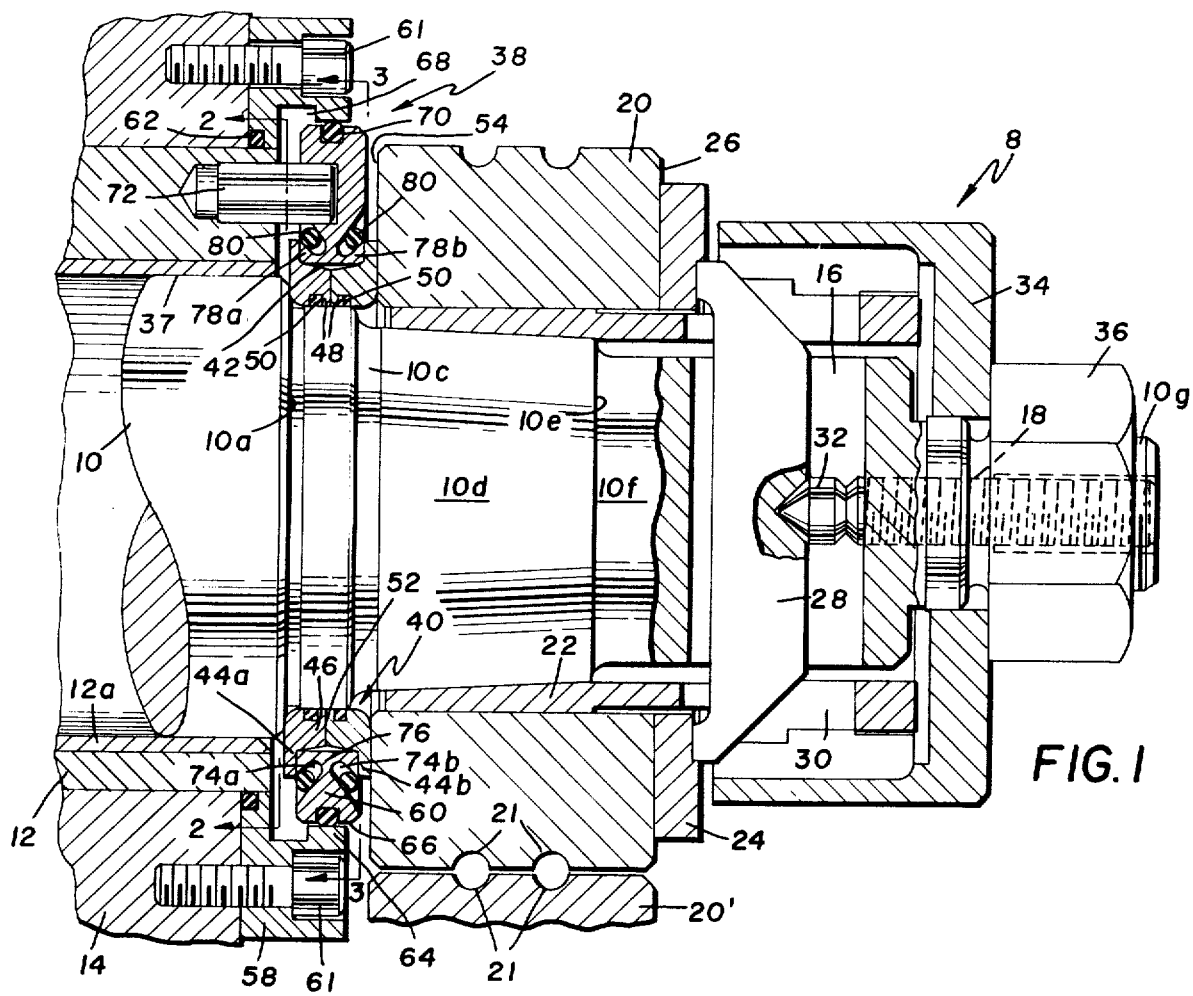

United States Patent [19]
Rich, Jr.

[11] 3,892,446
[45] July 1, 1975

[54] SHAFT SEAL

[75] Inventor: Charles A. Rich, Jr., Southboro, Mass.

[73] Assignee: Morgan Construction Company, Worcester, Mass.

[22] Filed: Apr. 29, 1974

[21] Appl. No.: 464,836

[52] U.S. Cl............................ 308/36.1; 308/187
[51] Int. Cl...................... F16c 1/24; F16c 33/72
[58] Field of Search.................. 308/36.1, 36.2, 187

[56] References Cited
UNITED STATES PATENTS

| | | | |
|---|---|---|---|
| 2,566,679 | 9/1951 | Sendzimir et al. | 308/187 X |
| 2,913,169 | 11/1959 | Wilsmann | 308/36.1 |
| 2,955,001 | 10/1960 | Rich, Jr. | 308/36.1 |
| 3,097,023 | 7/1963 | Nojima | 308/36.2 |
| 3,223,463 | 12/1965 | Porath | 308/36.1 |

Primary Examiner—Lloyd L. King
Attorney, Agent, or Firm—Thompson, Birch, Gauthier & Samuels

[57] ABSTRACT

A seal for use between a housing and a rotatable shaft is disclosed. The seal includes a first sealing assembly mounted on the roll shaft for rotation therewith, the said first assembly having an outer peripheral groove formed between a pair of radially extending flingers. A second sealing assembly sealingly engages the housing, with an annular portion thereof protruding radially inwardly into the peripheral groove of the first sealing assembly. The said protruding portion is provided with flanges which frictionally engage the flingers on the first sealing assembly.

6 Claims, 4 Drawing Figures

SHAFT SEAL

DESCRIPTION OF THE INVENTION

This invention relates generally to seals, and is concerned in particular with a novel and improved seal for use between a rotatable shaft and a housing containing the shaft bearings. The invention is especially suited for, although not limited in application to, rolling mill installations where pairs of roll shafts are journalled for rotation in roll housings, with the ends of the shafts protruding from the housings to receive work rolls in removable engagement thereon, and with roll parting adjustment means being employed to vary the spacing between the roll shafts and the work rolls during the rolling operation.

In rolling mill installations of the type referred to above, seals are normally employed between the roll shafts and the roll housings, the function of the seals being to prevent loss of lubricating oil being applied to the shaft bearings, and also to prevent exterior contaminants such as for example cooling water, mill scale, etc. from penetrating into the shaft bearings and contaminating the lubricating oil. In the past, such seals have conventionally been characterized by non-rotatable flexible lip seals which surround the protruding roll shaft ends and which are supported by seal plates in sealing engagement with the roll housings. The lip seals engage annular surfaces on components which are mounted on the roll shaft for rotation therewith. Typically, such components may include an annular flinger and an annular end face of the work roll.

Although this type of seal arrangement has been widely employed with generally satisfactory results, it has been found that some oil leakage and oil contamination is experienced when, as a result of roll parting adjustments, the rotational axes of the roll shafts and the components mounted thereon are no longer concentrically arranged in relation to the surrounding lip seals. To a considerable extent, this leakage and contamination is due to the following: when a roll shaft and the components mounted thereon are arranged concentrically in relation to the surrounding lip seals, a given point on one of the annular surfaces contacted by a lip seal will not shift radially in relation to the lip seal as the shaft rotates. However, should the axis of the roll shaft be shifted to a non-concentric position relative to the axis of the surrounding lip seal, for example as the result of a roll parting adjustment, then as the shaft rotates, the same point will undergo constant radial shifting towards and away from the circular line of lip seal contact. Points directly adjacent to the lip seal will shift radially back and forth across the lip seal. As such points move radially outwardly across the lip seal, they will have a tendency to carry lubricating oil with them and this lubricating oil will ultimately be lost. Likewise, as the same points shift back radially inwardly across the lip seal, they will have a tendency to carry with them cooling water and other contaminants which will then be mixed with the lubricating oil.

A general object of the present invention is to provide a novel and improved seal which obviates the problems and advantages noted above.

A more specific object of the present invention is the provision of means for maintaining the relatively rotatable seal components in concentric alignment, regardless of roll parting adjustments.

Figure 2:
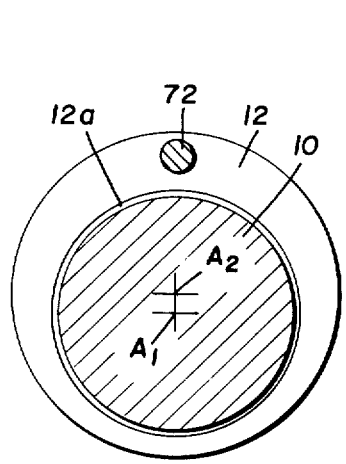
Figure 3:
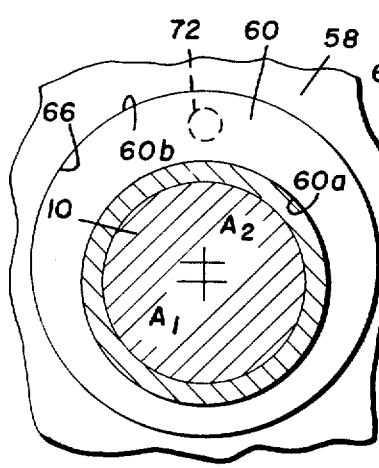
Figure 4:
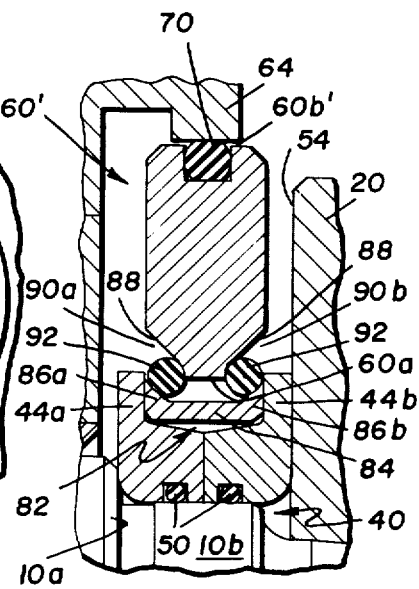

These and other objects and advantages of the present invention will become more apparent as the description proceeds with the aid of the accompanying drawings, wherein:

FIG. 1 is a sectional view through a roll assembly in a rolling mill, showing one embodiment of a seal in accordance with the present invention;

FIGS. 2 and 3 are sectional views taken along lines 2-2 and 3—3 of FIG. 1; and,

FIG. 4 is an enlarged sectional view of a portion of a seal showing an alternate embodiment of the invention.

Referring now to FIGS. 1–4 of the drawings, a typical "cantilevered" or "overhung" roll assembly 8 for a rolling mill is shown, including a roll shaft 10 journalled for rotation in an eccentric sleeve 12 which preferably although not necessarily includes a replaceable liner or bushing 12a. The eccentric sleeve 12 is in turn journalled for adjustable rotation in a roll housing 14. As is best shown in FIG. 2, the rotational axis $A_1$ of the roll shaft 10 is spaced laterally from and parallel to the rotational axis $A_2$ of the eccentric sleeve 12. A work roll 20 is mounted on the roll shaft 10. The work roll has grooves 21 which cooperate with identical grooves on a mating roll 20' to roll product directed therebetween. Rotatable adjustment of the eccentric sleeve 12 will produce a shifting of the roll shaft 10 and the work roll 20 mounted thereon relative to its mate 20'. Such adjustments are periodically performed during a rolling operation to compensate for wear of the roll grooves 21 and to control the cross-section of the product being rolled. The construction of the roll housing as well as the means employed to rotatably adjust the eccentric sleeve in relation to the housing are well known to those skilled in the art and thus a further description of these components will not be included herein. Also, although the following description will be directed to the roll assembly 8 of roll 20, it will be understood that the roll assembly of its mating roll 20' is basically the same.

The roll shaft 10 has an end which protrudes axially from the roll housing 14. As viewed from left to right in FIG. 1, this protruding end includes a shoulder 10a, a short cylindrical section 10b of reduced diameter, a shoulder 10c, a tapered section 10d, another shoulder 10e, a further reduced diameter section 10f and a threaded end 10g. Section 10f is provided with a transverse slot 16, and a threaded bore 18 extends axially through the threaded end 10g and the section 10f into communication with with the transverse slot 16. The work roll 20 is axially mounted on the protruding end of the roll shaft 10 and is held in place on the tapered section 10d by a collet member 22 tightly inserted between. A retainer ring 24 is held against the outer annular face 26 of the work roll 20 by means of a key 28 which extends through the transverse slot 16 in the roll shaft and a corresponding transverse slot 30 in the collet member 22. The key 28 is held in place by means of a retaining screw 32 which is threaded through the bore 18. A cover 34 is inserted over the shaft end and is held in place by a nut 36 threaded onto the shaft end 10g.

During a rolling operation, lubricating oil is continuously supplied as at 37 between the roll shaft 10 and the eccentric sleeve bushing 12a, and a solution of cooling water and rolling lubricant is continuously applied to the surfaces of the work rolls 20, 20'. The present invention is directed to a seal generally indicated at 38, which is located between the roll housing 14 and the roll shaft 10, and which operates to prevent the loss of lubricating oil while at the same time preventing exterior contaminants from penetrating into the housing interior.

Seal 38 includes a circular first sealing assembly or means 40 which is mounted tightly on and in sealing engagement with the reduced diameter shaft section 10b for rotation with the shaft. As herein employed, the term "sealing engagement" is intended to cover the combination of two components in a manner which precludes or at least substantially minimizes any fluid leakage therebetween. The assembly 40 has a radially outwardly facing peripheral first groove 42 which is defined by a pair of opposed first flanges or flingers 44a, 44b which extend radially outwardly from a base section 46. The base section is grooved internally as at 48 to receive O-rings 50. Preferably, for ease of fabrication, the sealing assembly 40 is centrally subdivided as at 52 into two abutting circular sections held together by pins or the like (not shown). The assembly 40 is axially inserted on the protruding roll shaft end and is held in place against the shaft shoulder 10a by the inner annular face 54 of the work roll 20.

A second sealing means or assembly extends between the roll housing 14 and the first sealing assembly 40. The second sealing means includes an outer section or cover plate which acts as an intermediate support for an annular inner section 60. The seal cover 58 is removably secured to the housing 14 by any convenient means such as for example the bolts indicated typically at 61. The cover plate 58 is in sealing engagement with the housing and the end of the eccentric sleeve 12 by means of an O-ring 62. The seal cover 58 has a circular flange 64 in alignment with the peripheral groove 42 on the first sealing assembly 40. The flange 64 defines a circular opening 66 through which the roll shaft end protrudes. The seal cover 58 cooperates with the roll housing to define a chamber 68 which receives the lubricating oil escaping at 37 from between the roll shaft 10 and the eccentric sleeve bushing 12a. Drain means "not shown" connects the chamber 68 to the mill's lubricating oil system. As can be seen in FIG. 3, the annular inner section 60 is also provided with an eccentric configuration. The inner edge 60a of annular section 60 is concentric with the rotational axis $A_1$ of roll shaft 10, and its outer edge 60b is concentric with the rotational axis $A_2$ of the eccentric sleeve 12. The outer edge 60b is grooved to accept an O-ring 70. The eccentric "throw", i.e., the movement imparted to axis $A_1$ relative to axis $A_2$ for a given rotational adjustment of annular section 60, is identical to the throw of eccentric sleeve 12. Annular section 60 is connected to eccentric sleeve 12 by means of an intermediate pin 72. Hence, any rotation of eccentric sleeve 12 for roll parting adjustment purposes will be transmitted to annular section 60. Since the eccentric throws of sleeve 12 and annular section 60 are identical, the relationship between the inner first sealing assembly 40, which rotates with the roll shaft 10, and the surrounding adjacent surfaces of the annular section 60, will remain unchanged. Stated alternatively, the inner edge 60a of annular section 60 will remain concentric with the first sealing assembly 40 and the rotational axis $A_1$ of shaft 10, regardless of any roll parting adjustment.

The annular section 60 is provided with second axially opposed grooves 74a, 74b which are defined in part by a central web 76 and second flanges 78a, 78b located adjacent to the first flanges or flingers 44a, 44b on the first sealing assembly 40. The second flanges 78a, 78b are somewhat resilient and are urged outwardly into frictional contact with the first flanges 44a, 44b by means of O-rings 80 seated in the second grooves 74a, 74b.

In the alternate embodiment shown in FIG. 4, the annular inner section 60' is again provided with inner and outer edges 60a', 60b', the former being concentric with the rotational axis $A_1$ of shaft 10, and the latter being grooved to accept an O-ring 70 and being concentric with the rotational axis $A_2$ of the eccentric sleeve 12. A circular sub-assembly 82 is surrounded by the inner edge 60a' of section 60'. Sub-assembly 82 includes a central web 84 which is spaced radially from the inner edge 60a' of annular section 60', and which terminates at opposite ends in axially spaced second flanges 86a, 86b which cooperate with beveled walls 88 on section 60' to define second grooves 90a, 90b. O-rings 92 are seated in the second grooves 90a, 90b. The O-rings 92 provide a seal between the inner edges 60a' of section 60 and the web 84 and also urge the second flanges 86a, 86b into frictional engagement with the first flingers or flanges 44a, 44b of the first sealing assembly 40.

In light of the above, and by way of review, it will now be appreciated that the present invention is directed to a seal 38 which may be employed in combination with a roll shaft 10 journalled for roatation in an eccentric sleeve 12 which is in turn journalled for rotation in a housing 14, with one end of the shaft protruding axially from the housing to receive a roll 20 in removable engagement thereon. The seal 38 includes a circular first sealing assembly 40 mounted on the roll shaft 10 for rotation therewith, the said first sealing assembly having a peripheral first groove 42 formed between a pair of opposed first flanges or flingers 44a, 44b extending radially outwardly from a base section 46. A second sealing assembly surrounds the first sealing assembly 40 and is comprised of an outer section 58 fixed relative to the housing 14, and an annular inner section 60 supported by the outer section with a portion thereof protruding into the first groove 42. The aforesaid protruding portion has axially opposed second grooves 74a, 74b formed between the center thereof and second flanges 78, 78 b located adjacent to the first flanges or flingers 44a, 44b. O-rings 80 seated in the second grooves 74a, 74b urge the second flanges 78a, 78b into frictional contact with the first flanges 44a, 44b.

The eccentric configuration of the annular section 60, which is provided with the same eccentric throw as that of the eccentric sleeve 12, enables the relationship between the first flanges or flingers 44a, 44b and the second flanges 78a, 78b to remain unchanged, regardless of roll parting adjustments being imparted to the roll shaft 10. This effectively avoids the problems and disadvantages of prior art seal constructions. The alternate embodiment shown in FIG. 4 is characterized by the same advantageous features.

It is my intention to cover all changes and modifications of the embodiments herein chosen for purposes of disclosure which do not depart from the spirit and scope of the invention.

I claim:

1. For use in combination with a roll shaft journalled for rotation in an eccentric sleeve which is in turn journalled for rotation in a housing, with one end of the shaft protruding axially from the housing to receive a roll in removable engagement thereon, apparatus for providing a seal between the roll shaft and the housing, comprising: a circular first sealing assembly mounted on the roll shaft for rotation therewith, said first sealing assembly having a peripheral first groove formed between a pair of opposed first flanges extending radially outwardly from a base section, a second sealing assembly surrounding said first sealing assembly, said second sealing assembly having an outer section fixed relative to said housing, an annular inner section supported by said outer section with a portion thereof protruding into said first groove, said protruding portion having axially opposed second grooves formed between the center thereof and second flanges located adjacent to said first flanges, and means seated in said second grooves for urging said second flanges into frictional contact with said first flanges.

2. The apparatus as claimed in claim 1 wherein the annular inner section of said second sealing assembly is axially separable from and rotatable relative to the circular outer section thereof.

3. The apparatus as claimed in claim 2 wherein said roll shaft is journalled for rotation about a first axis in said eccentric sleeve, and said eccentric sleeve is in turn rotatably adjustable in said housing about a second axis which is parallel to said first axis, the annular inner section of said second sealing assembly also having an eccentric configuration with its inner edge concentric with said first axis and its outer edge concentric with said second axis, and means for connecting said annular inner section to said eccentric sleeve, whereby rotative adjustment of said eccentric sleeve relative to said housing will result in corresponding rotative adjustment being imparted to said annular inner section relative to said outer circular section.

4. The apparatus as claimed in claim 3 wherein said first sealing assembly is centrally divided into two abutting circular sections, each of which is internally grooved to receive a sealing ring.

5. The apparatus as claimed in claim 4 wherein the outer edge of said annular inner section is grooved to receive a sealing ring.

6. The apparatus as claimed in claim 3 wherein said second flanges are interconnected by intermediate means which cooperates with said second flanges to form a sub-assembly which is separable from said annular inner section.

* * * * *